United States Patent
Ishikawa et al.

(10) Patent No.: US 10,604,279 B2
(45) Date of Patent: Mar. 31, 2020

(54) PROPELLANT TANK FOR SPACECRAFT AND SPACECRAFT

(71) Applicant: MITSUBISHI HEAVY INDUSTRIES, LTD., Tokyo (JP)

(72) Inventors: Keitaro Ishikawa, Tokyo (JP); Taichi Aoyama, Tokyo (JP); Kiyoshi Kinefuchi, Ibaraki (JP); Koichi Okita, Ibaraki (JP); Wataru Sarae, Ibaraki (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 268 days.

(21) Appl. No.: 15/561,636

(22) PCT Filed: Mar. 18, 2016

(86) PCT No.: PCT/JP2016/058870
§ 371 (c)(1),
(2) Date: Sep. 26, 2017

(87) PCT Pub. No.: WO2016/158538
PCT Pub. Date: Oct. 6, 2016

(65) Prior Publication Data
US 2018/0072436 A1 Mar. 15, 2018

(30) Foreign Application Priority Data
Mar. 31, 2015 (JP) ................................. 2015-074308

(51) Int. Cl.
*B64G 1/40* (2006.01)
*F17C 3/04* (2006.01)
(Continued)

(52) U.S. Cl.
CPC ............... *B64G 1/402* (2013.01); *B64G 1/40* (2013.01); *F02K 9/605* (2013.01); *F17C 3/04* (2013.01);
(Continued)

(58) Field of Classification Search
CPC .......... B64G 1/40; B64G 1/401; B64G 1/402; F17C 13/008; F17C 13/088;
(Continued)

(56) References Cited

U.S. PATENT DOCUMENTS 3,001,376 A * 9/1961 Webster ................. F02K 9/605
62/50.1
3,176,882 A * 4/1965 Meermans ............. B64G 1/402
222/187

(Continued)

FOREIGN PATENT DOCUMENTS

JP 62-8900 1/1987
JP 62-55299 3/1987
(Continued)

OTHER PUBLICATIONS

International Search Report dated Jun. 14, 2016 in International (PCT) Application No. PCT/JP2016/058870.
(Continued)

*Primary Examiner* — Medhat Badawi
(74) *Attorney, Agent, or Firm* — Wenderoth, Lind & Ponack, L.L.P.

(57) ABSTRACT

To provide a propellant tank such as a fuel tank and an oxidant tank for a spacecraft, the propellant tank discharging propellant such as liquid hydrogen and liquid oxygen accumulated therein toward a rocket engine by pressurizing an inside thereof by operating gas. The propellant tank includes a tank body that accumulates therein the propellant in a liquid state, and a holding container that is provided inside (Continued)

the tank body and disposed with a predetermined gap from an inner wall of the tank body, so that the propellant in a liquid state can be held therein, when the inside of the tank body is in a microgravity state or a zero-gravity state.

7 Claims, 2 Drawing Sheets

(51) Int. Cl.
    *F17C 13/08*     (2006.01)
    *F02K 9/60*     (2006.01)
    *F17C 9/00*     (2006.01)
    *F17C 13/00*     (2006.01)

(52) U.S. Cl.
    CPC .............. *F17C 9/00* (2013.01); *F17C 13/008* (2013.01); *F17C 13/088* (2013.01); *B64G 1/401* (2013.01); *F17C 2201/0109* (2013.01); *F17C 2201/054* (2013.01); *F17C 2201/056* (2013.01); *F17C 2203/0629* (2013.01); *F17C 2221/011* (2013.01); *F17C 2221/012* (2013.01); *F17C 2223/0161* (2013.01); *F17C 2265/066* (2013.01); *F17C 2270/0194* (2013.01); *F17C 2270/0197* (2013.01); *Y02E 60/321* (2013.01)

(58) Field of Classification Search
    CPC ........ F17C 2201/0109; F17C 2201/054; F17C 2201/056; F17C 2203/0629; F17C 2221/011; F17C 2221/012; F17C 2223/0161; F17C 2265/066; F17C 2270/0194; F17C 2270/0197; F17C 3/04; F17C 9/00; F02K 9/605; Y02E 60/321
    See application file for complete search history.

(56) References Cited

U.S. PATENT DOCUMENTS

| | | | | |
|---|---|---|---|---|
| 3,286,463 A * | 11/1966 | McGroarty | ............ | B64G 1/402 60/39.48 |
| 3,304,729 A * | 2/1967 | Chandler | ................ | F17C 3/02 62/48.3 |
| 3,486,302 A * | 12/1969 | Paynter | ................ | F02K 9/605 96/174 |
| 3,581,464 A * | 6/1971 | Bhuta | ................ | B01D 50/00 95/247 |
| 3,720,044 A * | 3/1973 | Grove | ................ | B01D 19/0031 96/219 |
| 3,854,905 A * | 12/1974 | Balzer | ................ | B64D 37/10 96/220 |
| 3,903,924 A * | 9/1975 | Readman | ................ | B64D 37/08 137/574 |
| 3,933,448 A * | 1/1976 | Di Peri | ............. | B01D 19/0031 96/219 |
| 4,013,195 A * | 3/1977 | Ferris | ................ | B65D 83/0055 222/95 |
| 4,272,257 A * | 6/1981 | Ellion | ................ | B01D 19/0031 210/488 |
| 4,397,408 A * | 8/1983 | Robert | ................ | B64G 1/402 222/394 |
| 4,399,831 A * | 8/1983 | Robert | ................ | B64G 1/402 137/154 |
| 4,412,851 A * | 11/1983 | Laine | ................ | F17C 9/00 62/48.1 |
| 4,482,365 A * | 11/1984 | Roach | ................ | F02M 35/08 96/408 |
| 4,595,398 A * | 6/1986 | Orton | ................ | B64G 1/402 96/187 |
| 4,664,134 A * | 5/1987 | Pera | ................ | B64D 37/24 137/14 |
| 4,821,907 A * | 4/1989 | Castles | ................ | F17C 13/008 206/0.7 |
| 4,846,854 A * | 7/1989 | Dugan | ................ | B64G 1/402 95/260 |
| 4,904,284 A * | 2/1990 | Hanabusa | ........... | B01D 19/0052 494/56 |
| 5,111,856 A * | 5/1992 | Baralle | ................ | B64G 1/402 137/574 |
| 5,263,329 A * | 11/1993 | Grove | ................ | F17C 9/00 137/590 |
| 5,279,323 A * | 1/1994 | Grove | ................ | F17C 9/00 137/154 |
| 5,398,515 A * | 3/1995 | Lak | ................ | B64G 1/50 62/47.1 |
| 5,613,366 A * | 3/1997 | Schoenman | ............ | F17C 3/022 62/45.1 |
| 5,901,557 A * | 5/1999 | Grayson | ................ | F17C 1/00 62/45.1 |
| 6,089,027 A * | 7/2000 | Wang | ................ | F17C 1/00 62/46.1 |
| 6,111,187 A * | 8/2000 | Goyette | ................ | B63B 11/04 114/20.1 |
| 6,334,589 B1 * | 1/2002 | Kirn | ................ | B64G 1/402 244/135 R |
| 6,343,476 B1 * | 2/2002 | Wang | ................ | F17C 1/00 62/46.1 |
| 6,360,546 B1 * | 3/2002 | Wang | ................ | F17C 7/02 222/3 |
| 7,437,060 B2 * | 10/2008 | Wang | ................ | B01D 1/0082 392/386 |
| 7,568,352 B2 * | 8/2009 | Grayson | ................ | F17C 3/10 62/45.1 |
| 7,621,291 B2 * | 11/2009 | Behruzi | ................ | B64G 1/402 137/154 |
| 7,900,434 B2 * | 3/2011 | Grayson | ................ | B64G 1/401 60/257 |
| 8,025,721 B2 * | 9/2011 | Behruzi | ................ | B64G 1/402 220/745 |
| 8,043,396 B2 * | 10/2011 | Pessana | ................ | F17C 13/088 206/0.6 |
| 8,202,357 B2 * | 6/2012 | Behruzi | ................ | F02K 9/605 96/204 |
| 8,381,938 B2 * | 2/2013 | Behruzi | ................ | B64G 1/402 220/560.04 |
| 8,511,504 B2 * | 8/2013 | Tuttle | ................ | B64G 1/402 137/154 |
| 8,534,489 B2 * | 9/2013 | Tuttle | ................ | F02K 9/605 137/154 |
| 8,596,038 B2 * | 12/2013 | Yamamoto | ............. | B64G 1/402 60/250 |
| 8,690,000 B2 * | 4/2014 | Lacapere | ................ | B64G 1/402 220/560.04 |
| 8,881,501 B2 * | 11/2014 | Yamamoto | ............. | B64G 1/402 60/200.1 |
| 8,893,514 B2 * | 11/2014 | Valentian | ................ | B64G 1/402 62/47.1 |
| 9,395,048 B1 * | 7/2016 | Grayson | ................ | B64G 1/402 |
| 9,695,983 B2 * | 7/2017 | Mackey | ................ | F17C 1/00 |
| 9,905,392 B2 * | 2/2018 | Lozano | ................ | H01J 37/08 |
| 10,125,052 B2 * | 11/2018 | Lozano | ................ | C01B 32/05 |
| 10,308,377 B2 * | 6/2019 | Lozano | ................ | B64G 1/405 |
| 2008/0237099 A1 * | 10/2008 | Behruzi | ................ | F17C 13/088 210/151 |
| 2014/0020872 A1 * | 1/2014 | Kitayama | ................ | F02K 9/60 165/120 |
| 2014/0117021 A1 * | 5/2014 | Quemerais | ............. | B64G 1/402 220/560.12 |
| 2015/0292454 A1 * | 10/2015 | Yoshida | ................ | F28D 15/0275 123/445 |

(56) References Cited

U.S. PATENT DOCUMENTS

2016/0059970 A1* 3/2016 Embler .................. B29C 44/18
                                                                220/560.08
2018/0072436 A1* 3/2018 Ishikawa ................... F17C 3/04

FOREIGN PATENT DOCUMENTS

| JP | 4-48100 | 4/1992 |
|----|---------|--------|
| JP | 6-56097 | 3/1994 |
| JP | 10-35595 | 2/1998 |
| JP | 2008-189304 | 8/2008 |
| JP | 2008-267503 | 11/2008 |
| JP | 4660966 | 3/2011 |
| WO | 2014/061616 | 4/2014 |

OTHER PUBLICATIONS

Written Opinion of the International Searching Authority dated Jun. 14, 2016 in International (PCT) Application No. PCT/JP2016/058870.

Extended European Search Report dated Feb. 20, 2018 in European Patent Application No. 16772420.2.

* cited by examiner

PROPELLANT TANK FOR SPACECRAFT AND SPACECRAFT

FIELD

The present invention relates to a propellant tank for a spacecraft for accumulating liquid phase propellant, and a spacecraft.

BACKGROUND

Conventionally, there has been known a tank provided in an upper stage of a rocket to accumulate fuel (for example, see Patent Literature 1). A gas supply and extraction device is provided in the tank, and by supplying gas into the tank, the fuel in the tank is extracted.

Further, a propellant tank disposed in a zero-gravity environment or a microgravity environment to store propellant for a thruster of a space satellite has been known (for example, see Patent Literature 2). The propellant tank includes a tank body, and a propellant supply pipe for causing propellant to flow into the tank body so as to swirl along a circumferential direction of an inner wall surface of the tank body. Therefore, in the propellant tank, vapor-liquid separation can be performed so that an inner wall surface side of the tank becomes a liquid phase and the center side of the tank becomes a vapor phase.

CITATION LIST

Patent Literatures

Patent Literature 1: Japanese Patent Application Laid-open No. 2008-189304 A
Patent Literature 2: Japanese Patent No. 4660966 B

SUMMARY

Technical Problem

In an outer space, radiant heat from the sun is incident to the tank. Therefore, liquid phase propellant such as liquid hydrogen or liquid oxygen accumulated in the tank evaporates when coming in contact with an inner wall of the tank. Because the propellant needs to be supplied to a rocket engine in a liquid state, if the propellant evaporates, the propellant usable in the rocket engine decreases. Particularly, when a travel period of the spacecraft in an outer space becomes long, if a propellant evaporation rate increases, execution of a predetermined mission using the propellant becomes difficult.

The present invention has been achieved in view of the above problems, and an object of the present invention is to provide a propellant tank for a spacecraft that can suppress evaporation of liquid phase propellant accumulated in the propellant tank, and a spacecraft.

Solution to Problem

A propellant tank for a spacecraft according to the present invention can discharge propellant accumulated therein toward an engine by pressurizing an inside thereof by operating gas. The propellant tank includes a tank body that accumulates therein the propellant in a liquid state, and a holding container that is provided inside the tank body and disposed with a predetermined gap from an inner wall of the tank body, so that the propellant in a liquid state can be held therein, when the inside of the tank body is in a microgravity state or a zero-gravity state.

A spacecraft according to the present invention includes a propellant tank including a tank body that accumulates therein propellant in a liquid state, and a container that is provided inside the tank body and disposed with a predetermined gap from an inner wall of the tank body, so that the propellant in the liquid state can be held therein, when an inside of the tank body is in a microgravity state or a zero-gravity state, and a gas reservoir that supplies operating gas for pressurizing the inside of the propellant tank to discharge the propellant.

According to the configuration, when the spacecraft travels in an outer space, the suspended liquid phase propellant can be held in the holding container when the inside of the tank body is in a microgravity state or a zero-gravity state. At this time, because a gap is formed between the inner wall of the tank body and the holding container, it can be suppressed that the liquid phase propellant comes in contact with the inner wall of the tank body and evaporates. Accordingly, because evaporation of the liquid phase propellant can be suppressed, a decrease of usable propellant can be suppressed and the propellant can be efficiently used.

Further, the holding container allows passage of the propellant in a liquid state at a time of pressurization by the operating gas.

According to the configuration, when the propellant is discharged toward the engine, by pressurizing the inside of the tank body by the operating gas, the propellant stored in the holding container can be allowed to pass through the holding container and discharged to outside of the tank body. Accordingly, the propellant stored in the holding container can be favorably supplied toward the engine at the time of using the propellant.

Further, it is preferable that the holding container is configured by using a material on which surface tension of the propellant in a liquid state stage can act.

According to the configuration, the liquid phase propellant can be held in the holding container by the surface tension. Therefore, while the liquid phase propellant can be held in the holding container at the time of non-pressurization by the operating gas, the liquid phase propellant can be discharged outside from the inside of the holding container at the time of pressurization by the operating gas. As a material on which the surface tension of the liquid state propellant can act, for example, a mesh material having a mesh pattern or a porous sheet material can be used.

Further, it is preferable that the holding container is configured by using a mesh material having a mesh pattern.

According to the configuration, because the holding container can be configured by using a mesh material, the surface tension can be easily set according to the number of mesh openings of the mesh material. The holding container only needs to be a mesh material in which at least a part thereof has the mesh pattern. That is, the holding container can be formed partly by a mesh material or can be formed entirely by the mesh material. In the holding container, the number of mesh openings can be uniform, or can be non-uniform.

Further, it is preferable that the mesh material is wire mesh.

According to the configuration, because the mesh material can be configured by wire mesh, even if ultracold liquid oxygen or ultracold liquid hydrogen is used as the propellant, the holding container can have resistance properties against the propellant.

Further, it is preferable that the mesh material is a net configured by using polytetrafluoroethylene.

According to the configuration, because the mesh material can be configured by a net using polytetrafluoroethylene (PTFE net), even if ultracold liquid oxygen or ultracold liquid hydrogen is used as the propellant, the holding container can have resistance properties against the propellant. Further, because the FIFE net is lightweight as compared with the wire mesh, weight saving of the holding container can be achieved, thereby enabling to suppress an increase in the weight of the spacecraft by providing the holding container.

Further, it is preferable that the propellant tank for a spacecraft further includes a connection member that connects the inner wall of the tank body and the holding container with each other, and the connection member is configured by using a low heat-conducting material.

According to the configuration, the holding container can be fixed on the inner wall of the tank body by the connection member, while forming a gap between the holding container and the inner wall of the tank body. At this time, because the connection member can be configured by using a low heat-conducting material, heat of the tank body can be hardly transferred to the holding container, thereby enabling to suppress evaporation of the liquid phase propellant further. As the low heat-conducting material, for example, fiber-reinforced plastic, and a material having lower heat conductivity than the material configuring the tank body can be used.

Further, it is preferable that the propellant tank for a spacecraft further includes a reservoir container that is provided in the holding container on a discharge side of the propellant and can hold the propellant in a liquid state therein.

According to the configuration, because the liquid phase propellant can be held in the reservoir container, the liquid phase propellant can be held on the discharge side of the propellant in the holding container. Therefore, at a stage before acceleration is applied at the time of ignition of the engine and at an initial stage of ignition, the liquid phase propellant can be supplied favorably to the engine, while suppressing inflow of gas phase propellant into the engine. Accordingly, the propellant can be favorably burned in the engine.

Further, it is preferable that a relief valve for discharging the propellant is provided in the reservoir container, the propellant having become a gas phase inside the reservoir container.

According to the configuration, even if the propellant becomes a gas phase inside the reservoir container, the gas phase propellant can be discharged from the reservoir container via the relief valve. Therefore, it can be suppressed that the gas phase propellant is supplied to the engine.

DESCRIPTION OF EMBODIMENTS

Exemplary embodiments of the present invention will be explained in detail below with reference to the accompanying drawings. The present invention is not limited to the embodiments. Constituent elements in the embodiments include those that can be easily replaced or assumed by persons skilled in the art, or that are substantially equivalent.

Embodiment

Figure 1:
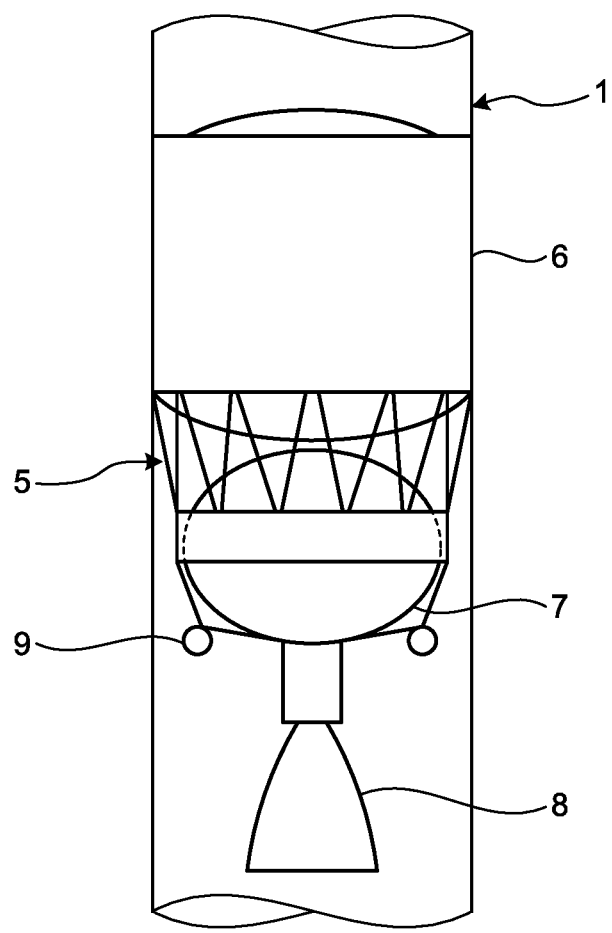
FIG. 1 is a schematic configuration diagram schematically illustrating a part of a rocket as a spacecraft according to an embodiment of the present invention.
Figure 2:
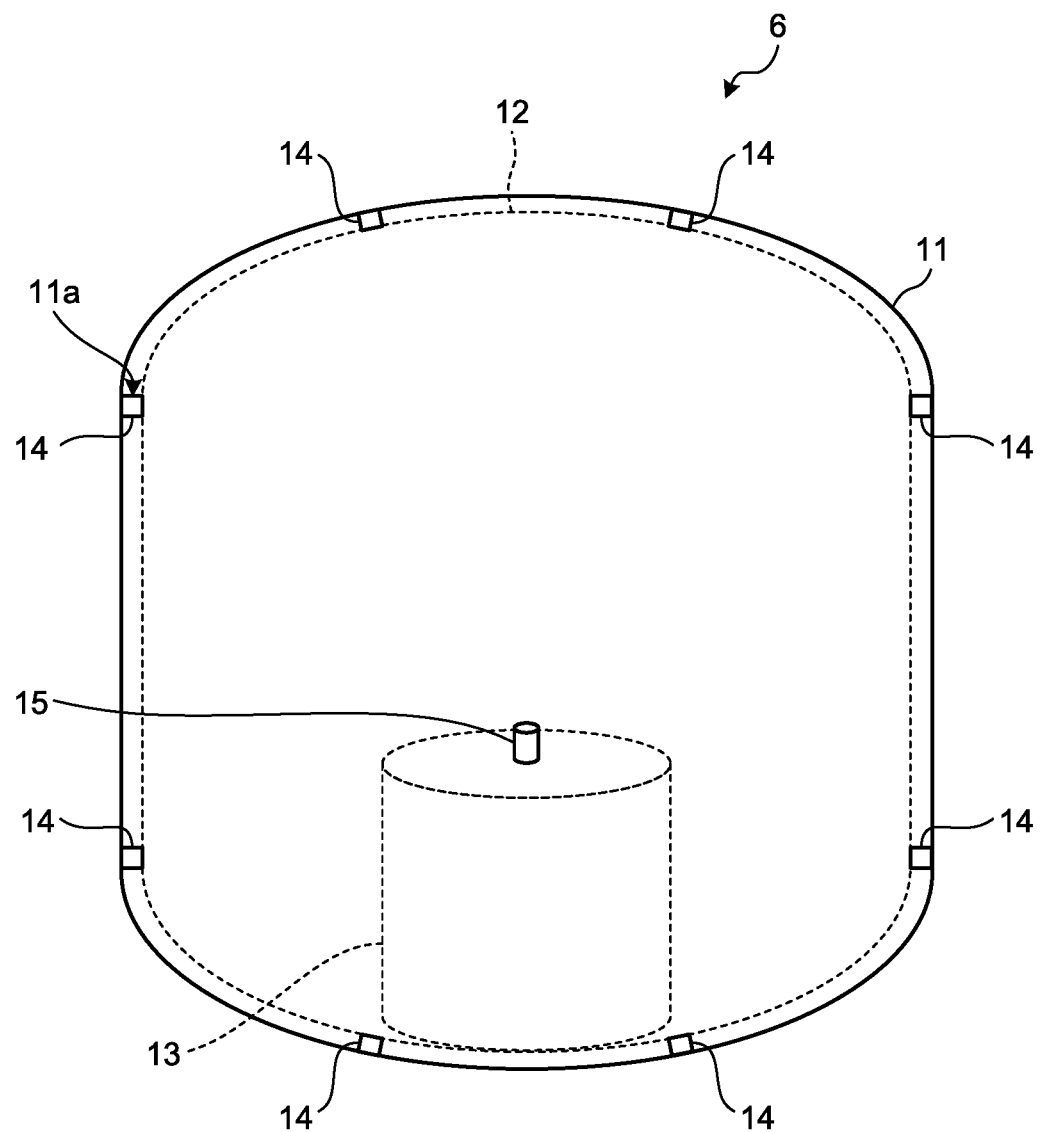
FIG. 2 is a schematic configuration diagram schematically illustrating the inside of a fuel tank and an oxidant tank.

FIG. 1 is a schematic configuration diagram schematically illustrating a part of a rocket as a spacecraft according to an embodiment of the present invention. FIG. 2 is a schematic configuration diagram schematically illustrating the inside of a fuel tank and an oxidant tank. A propellant tank according to the present embodiment is a tank for accumulating propellant to be used in a spacecraft. As the propellant, for example, liquid hydrogen ($LH_2$) as fuel and liquid oxygen ($LO_2$) as oxidant are applied. That is, the propellant tank is applied to a fuel tank 6 that accumulates liquid hydrogen and an oxidant tank 7 that accumulates liquid oxygen. As the spacecraft, there are a flying object such as a rocket, a space satellite, a space station, and the like. In the present embodiment, the spacecraft is applied to a rocket 1 and described. First, the rocket 1 provided with the fuel tank 6 and the oxidant tank 7 is described with reference to FIG. 1.

As illustrated in FIG. 1, the rocket 1 includes a frame 5, the fuel tank 6 supported on one side of the frame 5 (an upper side in FIG. 1), the oxidant tank 7 supported on the other side (a lower side in FIG. 1) of the frame 5, a rocket engine 8 that burns fuel to generate propulsive force, and a gas reservoir 9.

The frame 5 has a truss structure and is provided between the fuel tank 6 and the oxidant tank 7. The frame 5 is fixed to the fuel tank 6 on one side, and fixed to the oxidant tank 7 on the other side, thereby supporting the fuel tank 6 and the oxidant tank 7.

The fuel tank 6 is a liquid hydrogen tank for accumulating, for example, ultracold liquid hydrogen as fuel. The fuel tank 6 is supplied with operating gas from the gas reservoir 9 so that the inside thereof is pressurized, thereby enabling to supply liquid hydrogen toward the rocket engine 8.

The oxidant tank 7 is a liquid oxygen tank for accumulating, for example, ultracold liquid oxygen as oxidant. The oxidant tank 7 is supplied with operating gas from the gas reservoir 9 so that the inside thereof is pressurized, thereby enabling to supply liquid oxygen toward the rocket engine 8. The oxidant tank 7 is disposed opposite to the fuel tank 6, having the frame 5 therebetween.

The rocket engine 8 is provided below the oxidant tank 7, that is, on the side opposite to the fuel tank 6, having the oxidant tank 7 therebetween. The rocket engine 8 mixes and burns the liquid hydrogen supplied from the fuel tank 6 and the liquid oxygen supplied from the oxidant tank 7, to generate propulsive force. In this manner, the rocket engine 8 generates propulsive force by using fuel and oxidant in a liquid state.

The gas reservoir 9 is formed in a spherical shape with the inside being hollow, and accumulates operating gas for pressurizing the insides of the fuel tank 6 and the oxidant tank 7. The gas reservoir 9 is disposed below the oxidant tank 7 and on an outer peripheral side of the oxidant tank 7.

In this manner, in the rocket 1 that travels in an outer space, when the rocket engine 8 is to be combusted, operating gas is appropriately supplied from the gas reservoir 9 toward the fuel tank 6 and the oxidant tank 7. When the operating gas is supplied to the fuel tank 6, the inside of the fuel tank 6 is pressurized by the operating gas, to supply liquid hydrogen accumulated in the fuel tank 6 toward the rocket engine 8. Similarly, when the operating gas is supplied to the oxidant tank 7, the inside of the oxidant tank 7 is pressurized by the operating gas, to supply liquid oxygen accumulated in the oxidant tank toward the rocket engine 8. The liquid hydrogen and the liquid oxygen supplied to the rocket engine 8 are mixed and burned in the rocket engine 8, thereby providing propulsive force to the rocket 1. In the rocket 1 provided with the propulsive force, the liquid hydrogen accumulated in the fuel tank 6 accumulates on a bottom side (the other side) of the fuel tank 6 due to the propulsive force (acceleration). Similarly, the liquid oxygen accumulated in the oxidant tank 7 accumulates on a bottom side (the other side) of the oxidant tank 7 due to the propulsive force (acceleration).

On the other hand, in the rocket 1 that travels in an outer space, when the rocket engine 8 is not combusted, that is, when the insides of the fuel tank 6 and the oxidant tank are not pressurized by operating gas, propulsive force by the rocket engine 8 is not provided. Therefore, the insides of the fuel tank 6 and the oxidant tank 7 become a microgravity state or a zero-gravity state. The microgravity state can be generated by propulsive force applied by the thruster or the like provided in the rocket 1. In the microgravity state or a zero-gravity state, the liquid hydrogen accumulated in the fuel tank 6 is suspended in the fuel tank 6. Similarly, the liquid oxygen accumulated in the oxidant tank 7 is suspended in the oxidant tank 7.

Radiant heat from the sun is incident to the rocket 1 traveling in an outer space. Therefore, tanks such as the fuel tank 6 and the oxidant tank 7 are warmed by the radiant heat. At this time, in the tanks such as the fuel tank 6 and the oxidant tank 7, if liquid phase propellant such as the liquid hydrogen and the liquid oxygen is suspended, the suspended propellant comes in contact with the inner wall of the tank and evaporates. Therefore, the insides of the fuel tank 6 and the oxidant tank 7 have the configuration as illustrated in FIG. 2. While the configuration is applied to the fuel tank 6 and described below, the configuration can be also applied to the oxidant tank 7.

As illustrated in FIG. 2, the fuel tank 6 includes a tank body 11, a holding container 12 provided inside the tank body 11, a reservoir container 13 provided inside the holding container 12, and spacers (connection members) 14 provided between the tank body 11 and the holding container 12.

The tank body 11 is formed in a cylindrical shape. A plurality of ribs 11a for fixing the holding container 12 via the spacers 14 are formed on an inner wall of the tank body 11. Further, the tank body 11 provided with a discharge port (not illustrated) for discharging liquid hydrogen, and a gas pressurization port (not illustrated) for causing operating gas supplied from the gas reservoir 9 to flow into the tank body 11.

The holding container 12 is provided inside the tank body 11, and is disposed with a predetermined gap from the inner wall of the tank body 11. Therefore, the holding container 12 is a small bag-shaped container slightly smaller than the tank body 11. The holding container 12 is connected to the inside of the tank body 11 via the spacer 14 and fixed thereto.

The holding container 12 is configured by using wire mesh having a mesh pattern. The wire mesh has resistance properties against ultracold liquid hydrogen. The wire mesh has a function of holding liquid hydrogen therein when the inside of the tank body 11 is in a microgravity state or a zero-gravity state, and allowing the liquid hydrogen to pass therethrough when propulsive force (gravitational force) by means of combustion of the rocket engine 8 is applied to the inside of the tank body 11. Further, the wire mesh has a function of holding the liquid hydrogen therein at the time of non-pressurization by operating gas, and allowing the liquid hydrogen to pass therethrough at the time of pressurization by the operating gas. The mesh of the wire mesh is set to a preferable one depending on conditions of the propellant to be used, disturbance, or the microgravity state. A preferable example of the mesh of the wire mesh is 400 mesh or more.

The wire mesh configured in this manner has a configuration in which the surface tension of the liquid hydrogen can act thereon. That is, when there is no pressure by the operating gas, when the pressure by the operating gas is smaller than the surface tension of the liquid hydrogen, or when the propulsive force of the rocket 1 is smaller than the surface tension, the holding container 12 can hold the liquid hydrogen therein by suppressing passage of the liquid hydrogen. On the other hand, when the pressure by the operating gas is larger than the surface tension of the liquid hydrogen, or when the propulsive force of the rocket 1 is larger than the surface tension thereof, the holding container 12 can allow the liquid hydrogen to pass therethrough and flow outside.

The holding container 12 has a uniform number of mesh openings over the entire area. At this time, as the holding container 12, wire mesh having a configuration in which the surface tension of the liquid hydrogen can act thereon and the weight thereof is light is used. That is, by the holding container 12 having a uniform number of mesh openings over the entire area, wire mesh with lightweight can be used over the entire area, thereby enabling to suppress an increase in weight.

The spacer 14 is to connect the inner wall of the tank body 11 and the holding container 12 with each other, and is provided at a plurality of positions. The spacer 14 is configured by using a low heat-conducting material, and as the low heat-conducting material, for example, fiber reinforced plastics (FRP) is used. The material of the spacer is not limited to the low heat-conducting material, and titanium alloy or the like can be used. The spacer 14 is connected at one end to the rib 11a formed on the inner wall of the tank body 11, and at the other end to an outer surface of the holding container 12. By providing the spacers 14, a predetermined gap is maintained between the inner wall of the tank body 11 and the holding container 12.

The reservoir container 13 is provided inside the holding container 12 and on the discharge port side (on the lower side in FIG. 2) for discharging liquid hydrogen. The reservoir container 13 is, for example, a cylindrical bag-shaped container, and is attached in contact with an inner surface of the holding container 12.

The reservoir container 13 is configured by using wire mesh having a mesh pattern similarly to the holding container 12. That is, the wire mesh of the reservoir container 13 has a function of holding the liquid hydrogen therein at the time of non-pressurization by the operating gas, and allowing the liquid hydrogen to pass therethrough at the time of pressurization by the operating gas. The wire mesh used in the reservoir container 13 can be identical to the wire mesh used in the holding container 12, or can be different from each other.

A relief valve 15 is provided in the reservoir container 13 in a portion opposite to a portion with which the holding container 12 comes in contact. The relief valve 15 is a valve for discharging gas phase hydrogen generated inside the reservoir container 13. While the relief valve 15 is opened when the pressure in the reservoir container 13 becomes a predetermined pressure or higher, the relief valve 15 is closed when the pressure in the reservoir container 13 becomes lower than the predetermined pressure.

In the rocket 1 traveling in an outer space, when the inside of the fuel tank 6 is in a microgravity state or a zero-gravity state and is not pressurized by operating gas, passage through the holding container 12 of liquid hydrogen suspended in the holding container 12 of the fuel tank 6 is suppressed by the surface tension. Therefore, the liquid hydrogen is held in the holding container 12. Similarly, passage through the reservoir container 13 of the liquid hydrogen suspended in the reservoir container 13 of the fuel tank 6 is suppressed by the surface tension.

On the other hand, in the rocket 1 traveling in an outer space, even if the inside of the fuel tank 6 is in a microgravity state or a zero-gravity state, when the inside of the fuel tank 6 is pressurized by operating gas, the liquid hydrogen suspended in the holding container 12 of the fuel tank 6 passes through the holding container 12 due to the pressure of the operating gas. Therefore, the liquid hydrogen passes through the holding container 12 and flows toward the discharge port. Similarly, the liquid hydrogen suspended in the reservoir container 13 of the fuel tank 6 passes through the reservoir container 13 due to the pressure of the operating gas and flows toward the discharge port.

Next, a selection method of wire mesh to be used in the holding container 12 and the reservoir container 13 is described. On the ground, when experiments are performed for selecting the wire mesh, liquid nitrogen ($LN_2$) that is easily handled is used. At this time, liquid nitrogen, liquid hydrogen, and liquid oxygen have different surface tension from each other. Therefore, by performing correction with respect to test results obtained by the liquid nitrogen, taking into consideration a difference in the surface tension, temperature, and the like of the liquid hydrogen and the liquid oxygen, wire mesh that has the number of mesh openings and a wire diameter suitable for the liquid hydrogen and the liquid oxygen can be selected.

As described above, according to the configuration of the present embodiment, when the rocket 1 travels in an outer space, when the inside of the tank body 11 is in a microgravity state or a zero-gravity state, suspended liquid phase propellant can be held in the holding container 12. At this time, because a gap is formed between the inner wall of the tank body 11 and the holding container 12, it can be suppressed that the liquid phase propellant comes in contact with the inner wall of the tank body 11 and evaporates. Accordingly, because evaporation of the liquid phase propellant can be suppressed, a decrease of usable propellant can be suppressed and the propellant can be efficiently used.

Further, according to the configuration of the present embodiment, when the propellant is discharged toward the rocket engine 8, by pressurizing the inside of the tank body 11 by operating gas, the propellant stored in the holding container 12 can be caused to pass through the holding container 12 and can be discharged to outside of the tank body 11. Accordingly, the propellant stored in the holding container 12 can be favorably supplied toward the rocket engine 8 at the time of using the propellant.

According to the configuration of the present embodiment, the liquid phase propellant can be held in the holding container 12 by the surface tension. Therefore, when the inside of the tank body 11 is in a microgravity state or a zero-gravity state, while the liquid phase propellant can be held in the holding container 12 at the time of non-pressurization by the operating gas, the liquid phase propellant can be discharged outside from the inside of the holding container 12 at the time of pressurization by the operating gas.

According to the configuration of the present embodiment, because the holding container 12 can be configured by using wire mesh having a mesh pattern, the surface tension can be easily set according to the number of mesh openings and the like of the wire mesh. Further, because the holding container 12 can be configured by using the wire mesh, even if ultracold liquid oxygen or ultracold liquid hydrogen is used as the propellant, the holding container 12 can have resistance properties against the propellant.

According to the configuration of the present embodiment, the holding container 12 can be fixed to the inner wall of the tank body 11 by the spacers 14, while forming a gap between the holding container 12 and the inner wall of the tank body 11. At this time, because the spacers 14 can be configured by using a low heat-conducting material, heat of the tank body 11 is hardly transferred to the holding container 12, thereby enabling to further suppress evaporation of the liquid phase propellant.

According to the configuration of the present embodiment, because the liquid phase propellant can be held in the reservoir container 13, the liquid phase propellant can be held on the discharge side of the propellant in the holding container 12. Therefore, at a stage before acceleration (propulsive force) is applied at the time of ignition of the rocket engine 8 and at an initial stage of ignition, if the inside of the tank body 11 is pressurized by operating gas, the liquid phase propellant can be supplied favorably to the rocket engine 8, while suppressing inflow of gas phase propellant into the rocket engine 8. Accordingly, the propellant can be favorably burned in the rocket engine 8.

According to the configuration of the present embodiment, even if the propellant becomes a gas phase inside the reservoir container 13, the gas phase propellant can be discharged from the reservoir container 13 via the relief valve 15. Therefore, it can be suppressed that the gas phase propellant is supplied to the rocket engine 8.

In the present embodiment, the holding container 12 and the reservoir container 13 are formed by using wire mesh. However, the material thereof is not limited thereto. The holding container 12 and the reservoir container 13 can be formed by using a net configured by using polytetrafluoroethylene (a PTFE net) instead of the wire mesh. Further, the material thereof is not limited to a mesh material such as the wire mesh and the PTFE net, and any material can be used so long as the surface tension of the liquid phase propellant can act on the material, and for example, a porous sheet material can be used.

Further, in the present embodiment, the holding container 12 only needs to be wire mesh in which at least a part thereof has a mesh pattern, and a part of the holding container 12 can be wire mesh or the entire holding container 12 can be wire mesh. Further, the holding container 12 can have a uniform number of mesh openings or the number of mesh openings can be non-uniform.

REFERENCE SIGNS LIST 1 rocket
5 frame
6 fuel tank
7 oxidant tank
8 rocket engine
9 gas reservoir
11 tank body
11a rib
12 holding container
13 reservoir container 14 spacer
15 relief valve

The invention claimed is:

1. A propellant tank for a spacecraft, the propellant tank being operable to discharge propellant to an engine by pressurizing an inside of the propellant tank with operating gas, the propellant tank comprising:
 a tank body;
 a holding container provided inside the tank body and disposed with a predetermined gap from an inner wall of the tank body, wherein the holding container is configured to hold the propellant in a liquid state when the inside of the tank body is in a zero-gravity state; and
 a reservoir container provided in the holding container on a discharge side of the tank body, the reservoir container being configured to hold the propellant in the liquid state,
 wherein the holding container and the reservoir container are formed of a mesh material having a mesh pattern,
 wherein surface tension of the propellant, in the liquid state, acts on the mesh material of the holding container, and
 wherein, when the inside of the tank body is in a zero-gravity state and is not pressurized by the operating gas, passage through the holding container of the propellant suspended in the holding container is suppressed due to the surface tension of the propellant in the liquid state so that the propellant in the liquid state will be held in the holding container.

2. The propellant tank for a spacecraft according to claim 1, wherein the holding container allows passage of the propellant in a liquid state at a time of pressurization by the operating gas.

3. The propellant tank for a spacecraft according to claim 1, wherein the mesh material is wire mesh.

4. The propellant tank for a spacecraft according to claim 1, wherein the mesh material is a net configuration comprised of polytetrafluoroethylene.

5. The propellant tank for a spacecraft according to claim 1, further comprising at least one spacer that connects the inner wall of the tank body and the holding container with each other by connecting a first side of the at least one spacer to the inner wall of the tank body and connecting a second side of the at least one spacer to the holding container, wherein
 the at least one spacer is comprised of a low heat-conducting material.

6. The propellant tank for a spacecraft according to claim 1, further comprising a relief valve in the reservoir container for discharging the propellant when the propellant is in a gaseous state inside the reservoir container.

7. A spacecraft comprising:
 a propellant tank including a tank body, a holding container provided inside the tank body and disposed with a predetermined gap from an inner wall of the tank body, wherein the holding container is configured to hold propellant in a liquid state when an inside of the tank body is in a zero-gravity state, and a reservoir container provided in the holding container on a discharge side of the tank body, the reservoir container being configured to hold the propellant in the liquid state; and
 a gas reservoir configured to supply operating gas for pressurizing the inside of the propellant tank to discharge the propellant,
 wherein the holding container and the reservoir container are formed of a mesh material having a mesh pattern,
 wherein surface tension of the propellant, in a liquid state, acts on the mesh material of the holding container, and
 wherein, when the inside of the tank body is in a zero-gravity state and is not pressurized by the operating gas, passage through the holding container of the propellant suspended in the holding container is suppressed due to the surface tension of the propellant in a liquid state so that the propellant in the liquid state will be held in the holding container.

* * * * *